United States Patent

[11] 3,544,068

| [72] | Inventor | Dalton Everett Rice<br>Houston, Texas |
|---|---|---|
| [21] | Appl. No. | 734,415 |
| [22] | Filed | June 4, 1968 |
| [45] | Patented | Dec. 1, 1970 |
| [73] | Assignees | M & J Valve Company<br>Houston, Texas<br>a corporation of Delaware;<br>M & J Development Company<br>Houston, Texas, a partnership consisting of<br>M. H. Grove and J. E. Grove,<br>Houston, Texas |

[54] VALVE CONSTRUCTION
4 Claims, 7 Drawing Figs.

[52] U.S. Cl. ................................................. 251/355
[51] Int. Cl. ........................................................ F16k 41/02
[50] Field of Search............................................ 251/355,
214; 137/312; 184/18, 6(S), 6(W), 1(E), 6(T)

[56] References Cited
UNITED STATES PATENTS

| 1,687,780 | 10/1928 | Neale ............................ | 184/6(T)UX |
| 1,714,954 | 5/1929 | Hanson et al. ................. | 184/6(T)UX |
| 2,816,566 | 12/1957 | Warren ......................... | 251/355X |
| 2,869,942 | 1/1959 | Volpin.......................... | 251/355X |
| 3,055,632 | 9/1962 | Scaramucci................... | 251/355X |
| 3,086,745 | 4/1963 | Natho........................... | 251/355X |
| 3,096,070 | 7/1963 | Wolfensperger............. | 251/214 |
| 3,307,574 | 3/1967 | Anderson..................... | 137/312 |
| 3,399,862 | 9/1968 | Cerow......................... | 251/214 |
| 3,428,297 | 2/1969 | Volpin......................... | 251/355 |

*Primary Examiner*—Samuel Scott
*Attorney*—Flehr, Hohbach, Test, Albritton & Herbert ABSTRACT: A gate valve of the type having operating means engaging a threaded portion of the operating rod. The valve yoke is tubular and surrounds the operating rod in such a manner as to form a closed space on the exterior side of the bonnet seal. This space accommodates lubricating oil (*e.g.*, as a body of oil or as oil carried by an oil impregnated medium) whereby the rod is lubricated.

Patented Dec. 1, 1970

INVENTOR.
DALTON E. RICE
BY Flehr, Hohbach, Vest,
Albritton & Herbert
ATTORNEYS

INVENTOR.
DALTON E. RICE
BY Flehr, Hohbach, Vest, Albritton & Herbert
ATTORNEYS

INVENTOR.
DALTON E. RICE
BY Flehr, Hohbach, Test, Albritton & Herbert
ATTORNEYS

VALVE CONSTRUCTION

BACKGROUND OF THE INVENTION

Gate valves such as are used in the petroleum industry for the handling of liquid and gaseous petroleum products are customarily provided with a yoke mounted upon the upper end of the valve body and serving to carry parts of the valve operating means, as for example a rotary nut which engages a threaded portion of the valve operating rod and gear means for turning the nut. The bonnet assembly on the upper end of the body includes sealing means for forming a fluidtight seal about the smooth cylindrical portion of the operating rod. In some of the more modern gate valves the sealing means is in the form of resilient O-rings, as for example, two axially spaced O-rings, with the region between the rings being ported to atmosphere to detect leakage. It has been observed that when such valves have been in operation over considerable periods of time for the handling of liquid and gaseous petroleum products, there is a noticeable deterioration of the operating rod, having reference particularly to the normally smooth cylindrical surface which moves through the bonnet sealing means when the valve is operated. The deterioration involves noticeable roughening of the surface, apparently due to repeated drying and hardening of films of liquids and condensates, and to metal corrosion with resulting pitting. Metal corrosion is attributed to corrosive acids and other chemicals present in liquid petroleum products and natural gas condensates. The net result is that the effectiveness of the sealing means is impaired since the resilient seal rings tend to become worn by wiping over rough surfaces, and because the rough and pitted surfaces tend to interfere with good sealing contacts with the resilient seal rings. The foregoing difficulty causes substantial expense in the maintenance and repair of gate valves. Once an operating rod has deteriorated to such an extent as to cause leakage, the valve must be taken out of service to replace both the operating rod and the seal rings.

SUMMARY OF THE INVENTION AND OBJECTS

This invention relates generally to gate valves suitable for use in the petroleum industry for the handling of various petroleum products.

It is an object of the invention to provide a gate valve which overcomes the difficulties outlined above, and which in particular minimizes or overcomes deterioration and roughening of the valve rod surface.

Another object of the invention is to provide a gate valve with means for maintaining adequate lubrication of the valve operating rod, the lubricating oil being applied in such a manner as to avoid roughening of the surface of the rod as previously described.

Additional objects and features of the invention will appear from the following description in which the preferred embodiment of the invention has been described in detail.

In general, the present invention consists of a gate valve including a valve body having alined flow passages, and a gate within the body movable between open and closed limiting positions. An operating rod extends into the body through the upper end thereof, and is connected to the corresponding end of the gate. The rod has its upper end portion threaded for cooperating with valve operating means. A bonnet means is carried by the upper end of the valve body and is provided with sealing means between the body and the operating rod. A vertically extending tubular yoke has its lower end secured to the valve body and surrounds the operating rod. There is an annular space between the operating rod and the walls of the tubular yoke which accommodates lubricating oil. Valve operating means is mounted on the upper end of the tubular yoke and includes rotatable means having threaded engagement with the threaded portion of the operating rod. The tubular yoke normally contains a quantity of lubricating oil which is at all times in direct contact with the smooth surface of the operating rod for normal operating positions of the valve.

DESCRIPTION OF THE PREFERRED EMBODIMENTS

Figure 1:
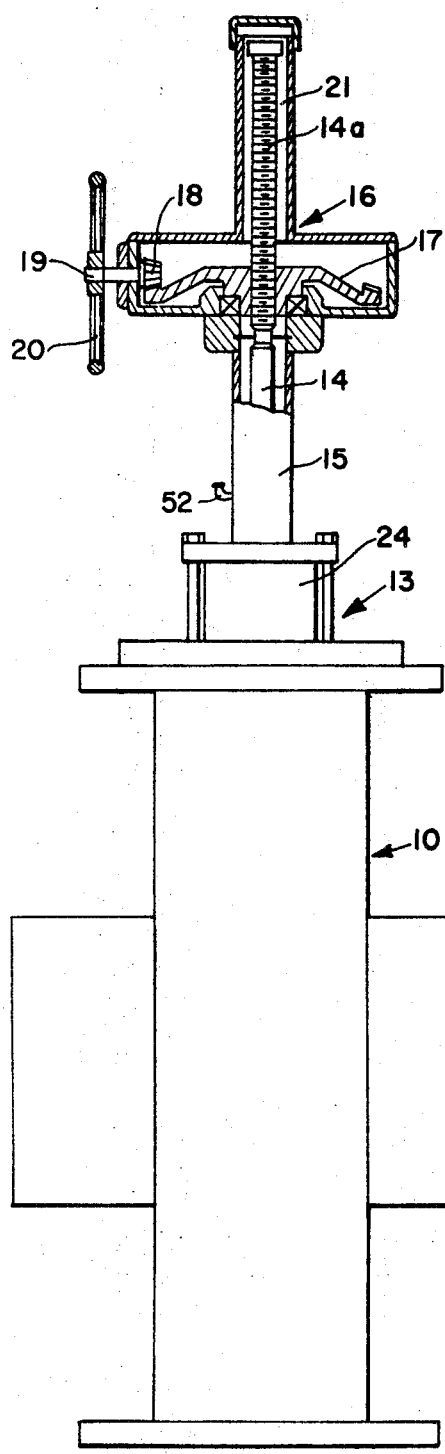
FIG. 1 is a side elevational view illustrating a gate valve of the type to which this invention is applicable.

FIG. 1 is a side elevational view of a gate valve of the type currently being used in the petroleum industry. These valves may range from the smaller valves of from, say, 6 to 12 inch pipe diameter, to the larger valves which may range from 12 to 42 inch pipe diameter. The body 10 of the valve may be boxlike and fabricated from steel mill shapes. The alined hubs 12 are adapted for connection with associated piping. A bonnet assembly 13 is carried at the upper end of the body and may be of the type disclosed in U.S. Pat. No. 3,279,747. The operating rod 14 of the valve is within a tubular yoke 15, the upper end of which carries the valve operator 16. This operator may consist of a rotatable gear 17 which engages the upper threaded portion of the operating rod and which in turn is engaged by pinion 18 secured to the shaft 19. The shaft 19 may carry a handwheel 20 for manual operation, or it may be connected to electrical, pneumatic, gas or hydraulic motors. A protector tube 21 extends above the operator 16 and serves to enclose the upper threaded end of the rod when the valve gate is in its open or raised position.

Figures 4, 5:
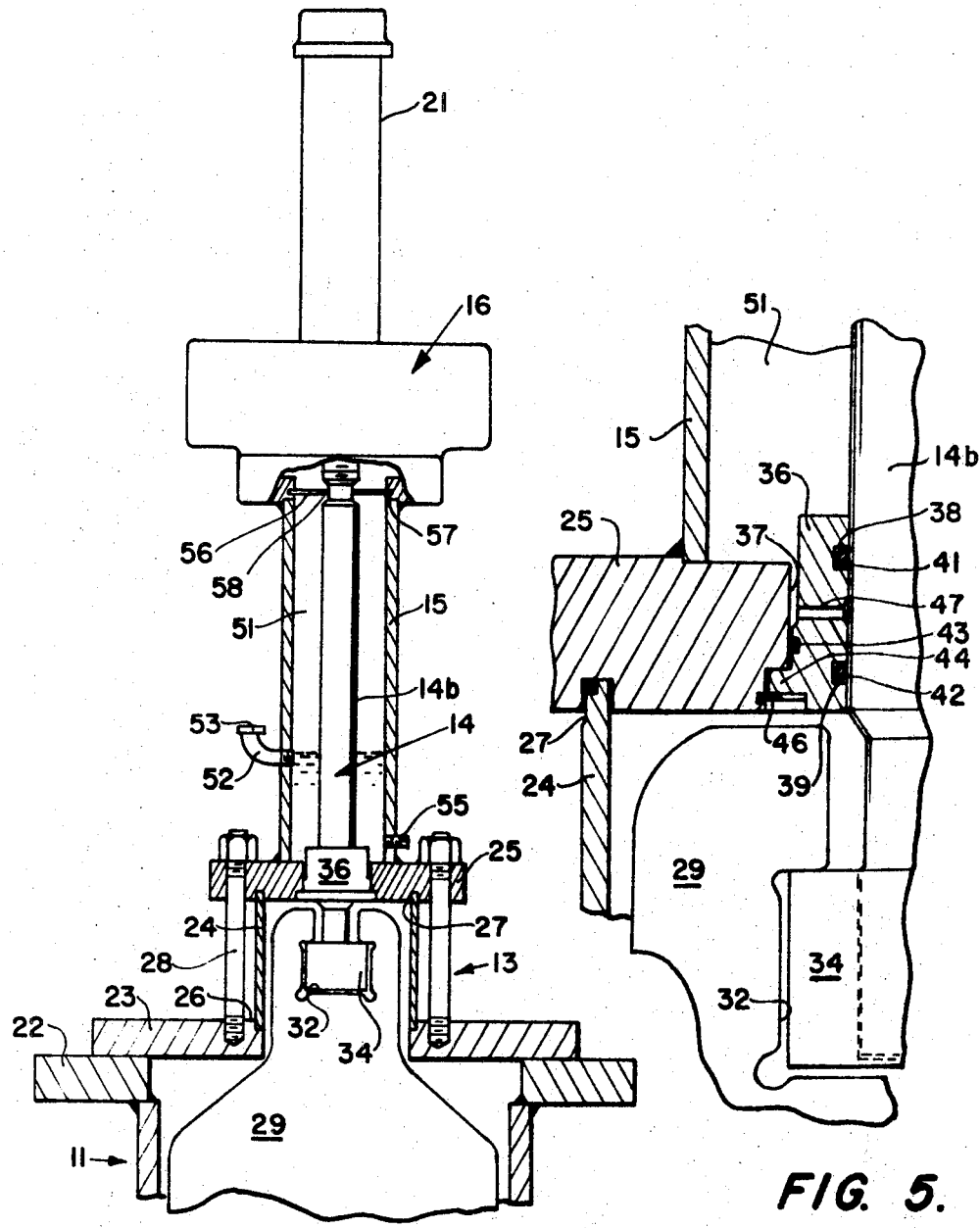
FIG. 4 is a detail in section showing the upper portion of the valve.
FIG. 5 is an enlarged sectional detail illustrating portions of the valve adjacent the sealing means between the valve operating rod and the valve body.

Referring now to FIG. 4, the valve body 11 is shown provided with an upper flange 22 to which the plate 23 is bolted. The bonnet assembly 13 consists of a short tubular member 24 which is seated upon plate 23 and which in turn seats the upper bonnet plate 25. In the construction illustrated, the plates 23 and 25 are provided with annular recesses 26 and 27 in which the ends of the tubular member 24 are seated, and sealing means as of the O-ring type is provided to prevent leakage. Clamping bolts 28 serve to firmly fix the bonnet assembly upon the plate 23. The gate 29 has its upper end coupled to the lower end of the vertical operating rod 14. The upper portion 14a of this rod is threaded for engagement with the rotatable nut of the operator 16. The lower portion 14b is cylindrical and is finished with a relatively smooth surface.

The attachment between the lower end of the operating rod and the gate may consist of the keyhole-shaped opening 32 in the gate which loosely accommodates a nut 34 threaded upon the lower end of the operating rod.

The means illustrated for establishing a seal between the operating rod and the plate 25 consists of a metal bushing 36 which is positioned within the central opening 37 in plate 25. The central bore of this bushing is provided with the annular grooves or recesses 38 and 39 which are spaced axially and which serve to accommodate the seal rings 41 and 42 of the resilient O-ring type. The bushing 36 is also sealed with respect to the plate 25 by the seal ring 43 of the resilient O-ring type. The lower end of the bushing 36 is provided with a flange 44 which is seated upon plate 25 and which is retained in place by the snap-in ring 46. At a level above the seal ring 43 the bushing is provided with one or more ducts 47.

The tubular yoke 15 has its lower end secured as by welding to the plate 25. The upper end of this yoke serves as a mounting for the operator 16, and in this connection serves the function of a conventional yoke in an ordinary gate valve. The space enclosed by the tubular yoke 15 about the operating rod 14 forms in effect a lubricating oil reservoir 51. When a quantity of oil as indicated is contained within this reservoir it is at all times in direct contact with the surface of the stem extending for a distance above the seal ring 41. By virtue of the ducts 47, such oil is also conducted into direct contact with that part of the valve stem between the seal rings 41 and 42, and particularly on the exterior side of the pressure resisting seal 42.

Figure 3:
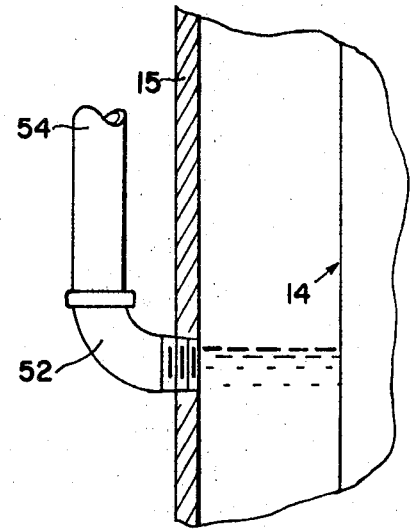
FIG. 3 is a detail illustrating a modification of FIG. 2.
Figure 2:
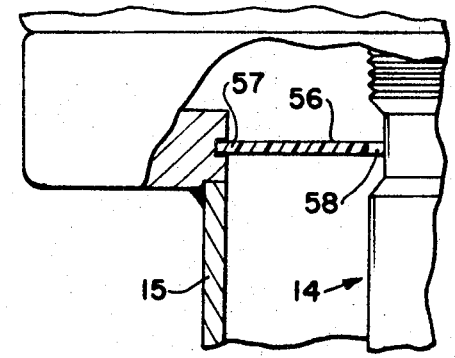
FIG. 2 is a side elevational view partly in section illustrating the upper portions of the valve, and particularly portions forming a lubricating reservoir.

A simple pipe fitting 52 is provided with a removable closure cap 53 shown mounted on one side of the tubular yoke 15 for the purpose of introducing the desired quantity of lubricating oil. As illustrated in FIG. 3, the fitting 52 may be connected with an extension pipe 54 in instances where the valve is mounted below the ground. Also removable fitting or plug 55 can be provided for drainage.

During shipment or installation of the valve, it may be tilted to various angles ranging from horizontal to vertical. Under such conditions, lubricating oil within the tubular yoke 48 might find its way into the housing of the operator 16, or in other words, it would not be retained within the tubular yoke. For this purpose, an annular barrier member 56 is located at the upper end of the tubular yoke, and is made of suitable resilient material capable of resisting oil, such as Teflon or the like. Its outer margin may be removably retained within the annular recess 57, and its central opening 58 can be of sufficient diameter to pass the threaded portion 14a of the operating rod. This type of lubricant barrier is sufficient to retain the lubricating oil within the tubular yoke for all positions of the valve ranging from horizontal to vertical, while at the same time enabling a sufficient amount of oil to be retained to ensure contact with the smooth surface of the operating stem at all times.

Operation of the valve described above is as follows. As previously explained, at all times the smooth surfaces of the valve operating rod immediately above the seals 41 and 42 is in direct contact with lubricating oil. When the valve operating stem is moved from its uppermost to its lowermost position (i.e., from open to closed position) the lubricating oil ensures lubrication of the rod as it moves downwardly through the bushing 36. When the valve is moved from closed to open positions, or in other words when the operating rod is raised to its uppermost position, the lubricating oil immediately bathes the smooth surface of the rod as it moves past the seals 41 and 42, and this serves to dissolve off or dissipate thin films of material derived from the liquid or gas in the body of the valve, which otherwise would remain upon the smooth surfaces of the valve stem with the detrimental results previously described. Although valve operating rod may remain in its raised position over a considerable period of time, its contact with the lubricating oil will not cause pitting or corrosion, and any oil film upon the rod above the bath of oil does not tend to dry and form hard surface accumulations. In this connection the lubricating oil should be selected to avoid any tendency to oxidize or dry upon exposure to atmosphere to form hard surface accumulations. Also it may embody corrosion inhibiting substances, such as chromates and the like.

Figure 6:
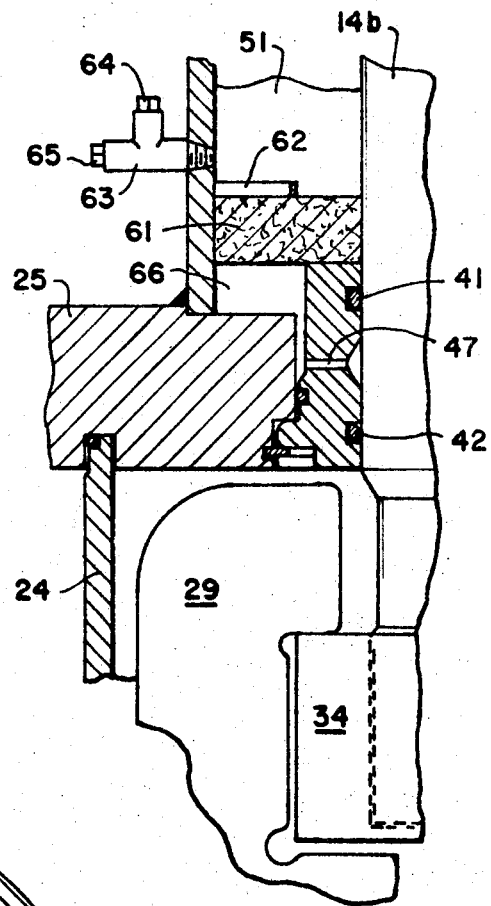
FIG. 6 is a detail in section like FIG. 5 but showing another embodiment.
Figure 7:
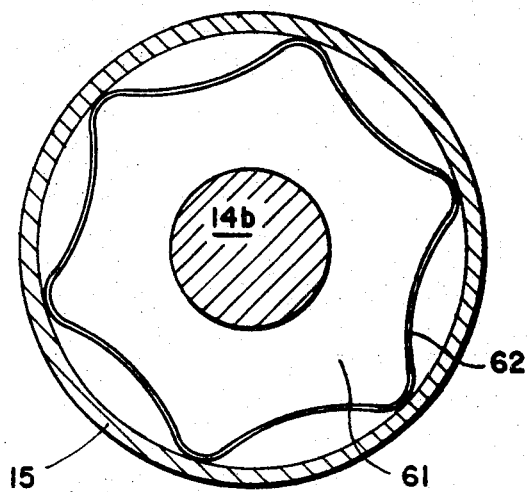
FIG. 7 is a cross-sectional detail illustrating retaining means for the oil impregnated annulus.

Another embodiment is shown in FIGS. 6 and 7. In this instance a porous annulus 61 surrounds the rod 14b in space 51. It may be made of various materials that can be impregnated with and which will retain lubricating oil. Reference can be made to felt made of natural or synthetic fibers and resilient open cell foamed or cellular plastics. The annulus is shown being retained adjacent the bushing 36 by the spring retainer 62 which has frictional engagement with the inner surface of yoke 15. At the time of installation the annulus is compressed radially whereby its outer periphery presses against the inner surface of yoke 15 and its inner periphery presses against the operating rod. A suitable fitting such as a pipe Tee 63 is shown communicating with space 51 above annulus 61. Plug 64 can be removed to introduce lubricating oil. Plug 65 may be provided with a pressure relief vent.

In practice, with the construction of FIGS. 6 and 7 the annulus may be factory impregnated with lubricating oil and some oil can be provided in the space 66 below the annulus. Also after field installation the customer may supply oil through fitting 63 to replenish the same or to impregnate the annulus 61 if it has not been factory impregnated. In general the annulus 61 presses against and wipes over the surfaces of rod portion 14b when the valve is operated whereby the same general results are accomplished as previously described. Also some free liquid oil finds its way into the region between the O-rings 41 and 42.

It will be evident that use of the present invention greatly facilitates the maintenance of gate valves in the petroleum industry. The surfaces of the stems are no longer subject to roughening, and therefore the bonnet seals will give long useful life without replacing either the stem or the seal rings.

I claim:

1. In a gate valve construction, a valve body having alined flow passages, a gate within the body and movable between open and closed limiting positions, an operating rod extending into the body through the upper end thereof and connected to the corresponding end of the gate, the rod having an upper threaded portion, bonnet means on the upper end of the valve body and surrounding the rod, sealing means of the O-ring type forming a seal between the body and the operating rod, a vertical tubular yoke having its lower end secured to the valve body and surrounding the operating rod, there being an annular space between the operating rod and the walls of the tubular yoke, valve operating means mounted on the upper end of the tubular yoke including rotatable means having threaded engagement with the threaded portion of the operating rod to raise and lower the same, said tubular yoke forming a reservoir for maintaining a quantity of lubricating oil in contact with the surface of the operating rod immediately above said sealing means, and an oil impregnated annulus of porous material disposed in the lower end of the tubular yoke above said sealing means, said annulus having its inner periphery in contact with the surface of the rod to apply lubricant to the same.

2. A valve construction as in claim 1 in which the annulus is fitted between the yoke and the rod, together with removable means for retaining the annulus in fixed position relative to the yoke.

3. In a gate valve construction, a valve body having alined flow passages, a gate within the body and movable between open and closed limiting positions, an operating rod extending into the body through the upper end thereof and connected to the corresponding end of the gate, the rod having an upper threaded portion, bonnet means on the upper end of the valve body and forming a seal between the body and the operating rod, a vertical tubular yoke having its lower end secured to the valve body and surrounding the operating rod, there being an annular space between the operating rod and the walls of the tubular yoke, valve operating means mounted on the upper end of the tubular yoke and including rotatable means having threaded engagement with the threaded portion of the operating rod to raise and lower the same, the tubular yoke forming a reservoir for maintaining a quantity of lubricating oil in contact with the surface of the operating rod immediately above said seal, the sealing means including at least two vertically spaced resilient seal rings carried by said bonnet means, the region between said seal rings being in continuous communication with the space in the lower portion of the tubular yoke.

4. A valve construction as in claim 3 in which the bonnet means is an assembly which includes a plate, the lower end of the tubular yoke being secured to said plate, the plate having an opening to accommodate said operating rod and in which the sealing means includes a bushing fitted within said opening and closely surrounding the operating rod, means for sealing the bushing with respect to said plate, and a pair of resilient seal rings carried by said bushing and forming a seal between said bushing and said operating rod, the bushing having at least one port communicating between the region between said seal rings and the space within the tubular yoke.